United States Patent [19]
Takahashi et al.

[11] Patent Number: 5,661,757
[45] Date of Patent: Aug. 26, 1997

[54] RADIO-CARD COMMUNICATION SYSTEM

[75] Inventors: Yasuo Takahashi, Yokosuka; Masumi Oyama, Tokyo; Tatsuya Gunji, Yokohama, all of Japan

[73] Assignee: Kabushiki Kaisha Toshiba, Kawasaki, Japan

[21] Appl. No.: 405,893

[22] Filed: Mar. 17, 1995

[30] Foreign Application Priority Data

Mar. 18, 1994 [JP] Japan ............... 6-047630

[51] Int. Cl.$^6$ ............... G06K 1/00; H04L 27/22
[52] U.S. Cl. ............... 375/281; 375/332; 329/306
[58] Field of Search ............... 375/219, 279–281, 375/283, 308, 324–325, 326, 329–332, 344–345; 329/304, 306

[56] References Cited

U.S. PATENT DOCUMENTS

| | | | |
|---|---|---|---|
| 3,737,776 | 6/1973 | Fletcher | 375/308 |
| 4,041,391 | 8/1977 | Deerkoski | 375/281 |
| 4,213,119 | 7/1980 | Ward et al. | 340/870.02 |
| 4,641,374 | 2/1987 | Oyama | 359/154 |
| 4,792,996 | 12/1988 | Oyama | 359/154 |
| 5,066,957 | 11/1991 | Mizuno et al. | 342/352 |
| 5,204,675 | 4/1993 | Sekine | 340/933 |
| 5,283,780 | 2/1994 | Schuchman et al. | 370/50 |
| 5,432,819 | 7/1995 | Mui | 375/329 |
| 5,533,113 | 7/1996 | Ozawa et al. | 379/211 |

FOREIGN PATENT DOCUMENTS

5-143792  6/1993  Japan .

*Primary Examiner*—Young T. Tse
*Attorney, Agent, or Firm*—Oblon, Spivak, McClelland, Maier & Neustadt, P.C.

[57] ABSTRACT

To receive a response signal from a radio card, a card reader transmits a carrier (not modulated) to the radio card. In the radio card, a phase modulator phase-modulates the a sub-carrier with a response signal, thereby generating a PSK signal, and a phase modulator phase-modulates the carrier with the PSK signal, producing a PSK-PSK signal. The PSK-PSK signal is supplied to an antenna via a signal-extracting device. The antenna sends the PSK-PSK signal toward the card reader. In the card reader, a distributor distributes the PSK-PSK signal to a synchronous detector and an orthogonal detector. The detectors performs synchronous detection by using carriers which differ in phase by 90°. Low-pass filters extract sub-carrier components from the outputs of the detectors. The sub-carrier components are delayed and detected by delay detectors and added together by an adder. The level of the output of the adder is determined by a data discriminator, whereby the card reader obtains the response signal transmitted from the radio card.

9 Claims, 5 Drawing Sheets

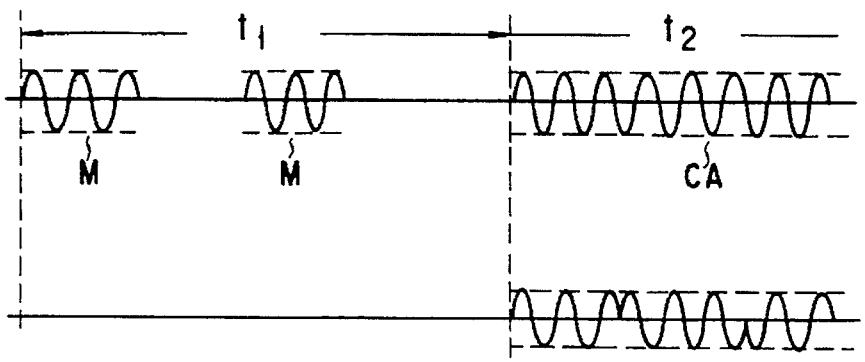
FIG. 7A
FIG. 7B
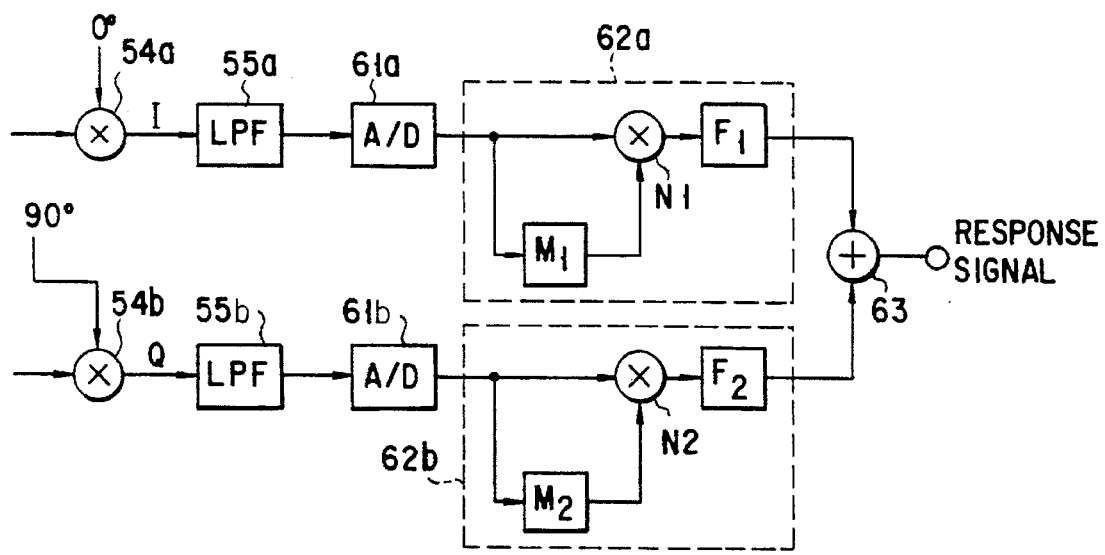
FIG. 8
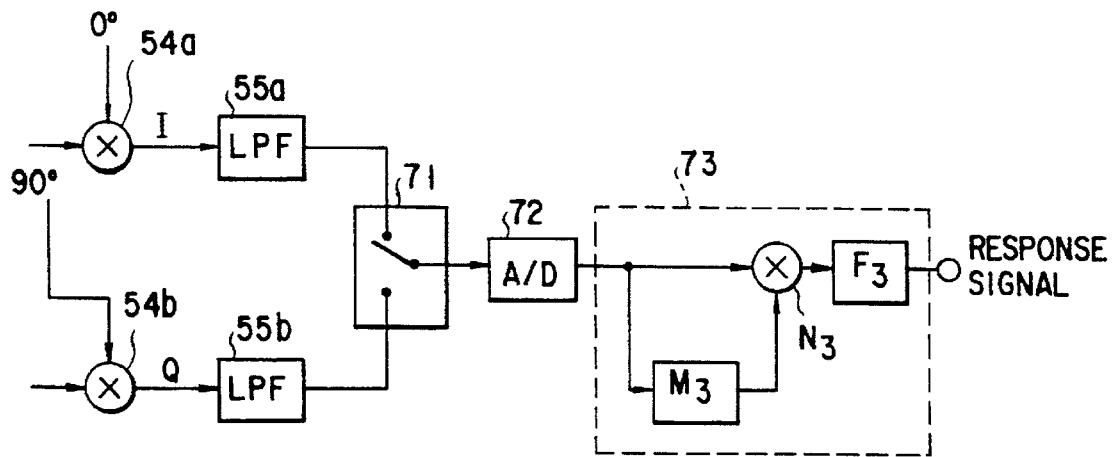
FIG. 9

RADIO-CARD COMMUNICATION SYSTEM

BACKGROUND OF THE INVENTION

1. Field of the Invention

The present invention relates to a radio-card communications system which comprises a radio card for transmitting data stored in it, in response to a question signal, and a card reader for generating and sending a question signal to the radio card.

2. Description of the Related Art

A radio-card communications system is known in which signals are exchanged between a card reader and a radio card. This system is schematically illustrated in FIG. 1. As FIG. 1 shows, the system comprises a card reader 1A and a radio card 1B.

The card reader 1A comprises a modulator 11, a transmitter 12, a signal-extracting device 13, an antenna 14, a receiver 15 and a demodulator 16. The modulator 11 modulates a carrier with a question signal (data). The transmitter 12 power-amplifies the modulated carrier output from the modulator 11. The power-amplified carrier is supplied via the signal-extracting device 13 to the antenna 14. The antenna 14 sends the carrier toward the radio card 1B. The antenna catches a modulated response signal (data) transmitted from the radio card 1B. The demodulated response signal is supplied via the signal-extracting device 13 to the receiver 15. The receiver 15 detects and supplies the response signal to the demodulator 16. The demodulator 16 demodulates the response signal.

The radio card 1B comprises an antenna 17, a signal-extracting device 18, a receiver 19, a demodulator 20, a modulator 21 and a transmitter 22. The antenna 17 receives a carrier signal modulated with a question signal that is transmitted from the card reader 1A. The modulated carrier is supplied via the signal-extracting device 18 to the receiver 19. The receiver 19 detects the carrier. The demodulator 20 demodulates the carrier, thus obtaining the question signal. The modulator 21 modulates a carrier with a response signal read from a memory (not shown). The transmitter 22 power-amplifies the modulated carrier. This carrier is supplied via the signal-extracting device 18 to the antenna 17, which sends the carrier modulated with the response signal, toward the card reader 1A.

The radio-card communications system of FIG. 1 uses a carrier having a frequency f1 to send data from the card reader 1A to the radio card 1B, and a carrier of a frequency of f2 to send data from the radio card 1B to the card reader 1A. That is, the system is a duplex system wherein two carriers of different frequencies are utilized—one in transmitting signals, and the other in receiving signals. Thanks to the difference in frequency between the transmitting carrier and the receiving carrier, the system shown in FIG. 1 is advantageous in some respects. First, it can employ various data transmission schemes applicable to radio-card communication. Second, data items can be transmitted in two directions at the same time.

There is a problem with the radio card 1B, however. The transmitter 22 incorporates a power amplifier. The radio card 1B inevitably consumes much power and needs to be equipped with a large battery (not shown). The larger the battery, the larger and heavier the radio card 1B. This runs counter to the demand that the radio card be as small and light as possible to increase its portability.

To solve this problem, a radio-card communications system has been developed which comprises a radio card having no power amplifiers as illustrated in FIG. 2. The components of this system, which are identical to those shown in FIG. 1, are denoted at the same reference numerals in FIG. 2 and will not be described in detail in the following explanation.

The radio-card communications system of FIG. 2 works exactly in the same way as in the system of FIG. 1 in order to transmit data from the card reader 1A to the radio card 1B. To transmit data the other way around, the card reader 1A sends a carrier having a frequency f1, not modulated, to the radio card 1B. In the radio card 1B, the carrier received by the antenna 17 is supplied via the signal-extracting device 18 to the modulator 21. The modulator 21 modulates the carrier with a response signal. The modulated carrier is supplied, without being power-amplified, through the signal-extracting device 18 to the antenna 17.

Having no power amplifier, the radio card 1B used in the communications system of FIG. 2 consumes only a little power. Hence, the radio card 1B only needs a small battery. A problem arises, however, because carriers of the same frequency f1 are used to transmit signals from the card reader 1A to the radio card 1B and vice versa. In the card reader 1A, part of a signal drifts from the transmitting section into the receiving section, adversely influencing the processing of the signal received.

The signal received by the card reader 1A has the high-frequency spectrum roughly sketched in FIG. 3A. It has the frequency spectrum roughly shown in FIG. 3B after it has been detected. In FIGS. 3A and 3B, frequencies are plotted on the abscissa, and signal magnitudes on the ordinate. As can be seen from FIGS. 3A and 3B, there is a small frequency difference between the carrier C and the modulated component S. It is difficult to separate the carrier C and the component S. If part of a signal drifts from the transmitting section into the receiving section and the received signal is at a low level, the modulated component S of the received signal cannot be detected. It is therefore necessary to set the received signal at a high level. To this end, the card reader 1A and the radio card 1B cannot be located at a long distance.

SUMMARY OF THE INVENTION

The object of the present invention is to provide a radio-card communications system in which the processing of received signals are not adversely influenced in a card reader even if carriers of the same frequencies are used to transmit signals from the card reader to a radio card and vice versa, and in which the power consumption in the radio card can therefore be minimized to reduce the size of the battery incorporated in the radio card.

According to the present invention, there is provided a radio-card communications system having a radio card for transmitting a response signal in response to a question signal, and a card reader for transmitting the question signal and receiving the response signal, the radio card comprising: carrier-receiving means for receiving a carrier transmitted from the card reader; sub-carrier generating means for generating a sub-carrier having a frequency lower than a frequency of the carrier; first phase-modulating means for phase-modulating the sub-carrier with the response signal, thereby to generate a PSK signal; second phase-modulating means for phase-modulating the carrier with the PSK signal, thereby to generate a PSK-PSK signal; and PSK-PSK signal transmitting means for transmitting the PSK-PSK signal to the card reader; and the card reader comprising: carrier-transmitting means for transmitting the carrier to the radio card in response to the response signal; PSK-PSK signal receiving means for receiving the PSK-PSK signal from the radio card; sub-carrier extracting means for performing orthogonal detection on the PSK-PSK signal, thereby to extract a sub-carrier component; and demodulating means for extracting a phase-modulated component from the sub-carrier component, thereby to demodulate the response signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A and 7B form a timing chart representing the timing of data communication achieved between the card reader and the radio card in the system of FIG. 4;

FIG. 8 is a block diagram showing a radio-card communications system according to a second embodiment of the invention, wherein the carrier is subjected to digital demodulation in the card reader;

FIG. 9 is a block diagram showing a radio-card communications system according to a third embodiment of this invention, which is more simple than the second embodiment.

DETAILED DESCRIPTION OF THE PREFERRED EMBODIMENTS

Embodiment of the present invention will now be described, with reference to the accompanying drawings.

Figure 4:
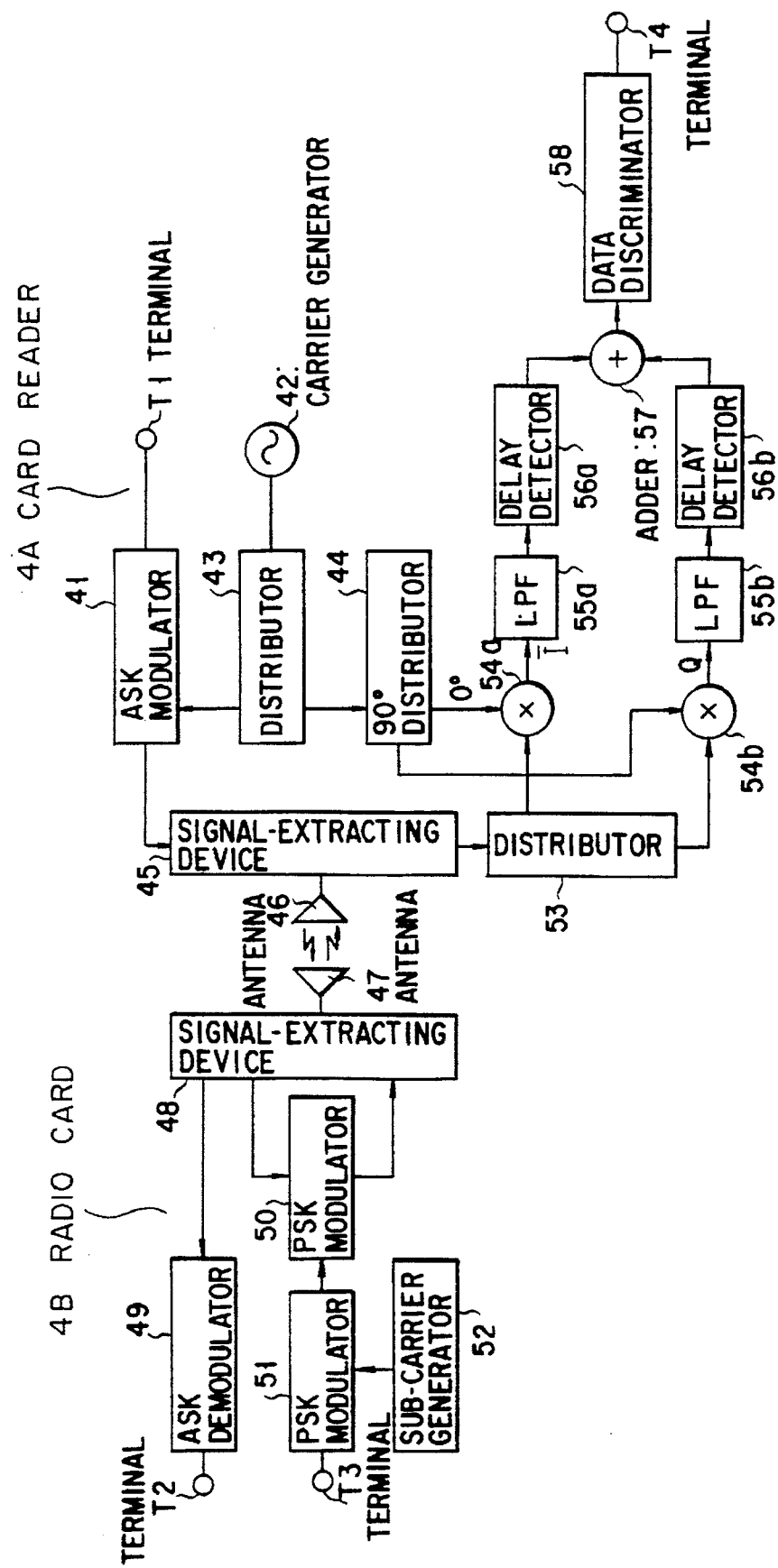
FIG. 4 is a block diagram illustrating a radio-card communications system according to a first embodiment of the present invention.

FIG. 4 shows a radio-card communications system according to the first embodiment of the invention. As is illustrated in FIG. 4, the radio-card communications system comprises a card reader 4A and a radio card 4B.

In the card reader 4A, a question signal (data) to be sent to the radio card 4B is input from a terminal T1. The data is supplied to an ASK (Amplitude Shift Keying) modulator 41.

A carrier is supplied to the ASK modulator 41 from a carrier generator 42 through a distributor 43. The distributor 43 is designed to distributes the carrier supplied from the carrier generator 42, to the ASK modulator 41 and a 90° distributor 44. The ASK modulator 41 amplitude-modulates the carrier with the question signal, thereby generating an ASK signal. The ASK signal is supplied via the signal-extracting device 45 to an antenna 46. The antenna 46 sends the ASK signal toward the radio card 4B.

In the radio card 4B, an antenna 47 receives the ASK signal, which is input via a signal-extracting device 48 to an ASK demodulator 49. The ASK demodulator 49 demodulates the ASK signal, thus acquiring the question signal. The question signal is output from a terminal T2.

To send a response signal (data) from the radio card 4B to the card reader 4A, a carrier required for this purpose is transmitted to the radio card 4B from the card reader 4A. More precisely, the carrier generated by the generator 42 is supplied to the antenna 46 through the ASK modulator 41 and the signal-extracting device 45, without being modulated at all. In the radio card 4B, the antenna receives the unmodulated carrier. The signal-extracting device 48 extracts this carrier and supplies it to a first PSK (Phase Shift Keying) modulator 50.

The response signal to be sent from the radio card 4B is coded data which consists of 1s and 0s. It has been read from a memory (not shown) incorporated in the radio card 4B and supplied from a terminal T3 to a second PSK modulator 51. More specifically, the response signal read from the memory has been subjected to differential coding, the results of which is input to the second PSK modulator 51. Hence, the response signal can be demodulated in the card reader 4A, by means of a delay detector, as will be described later.

Figure 1:
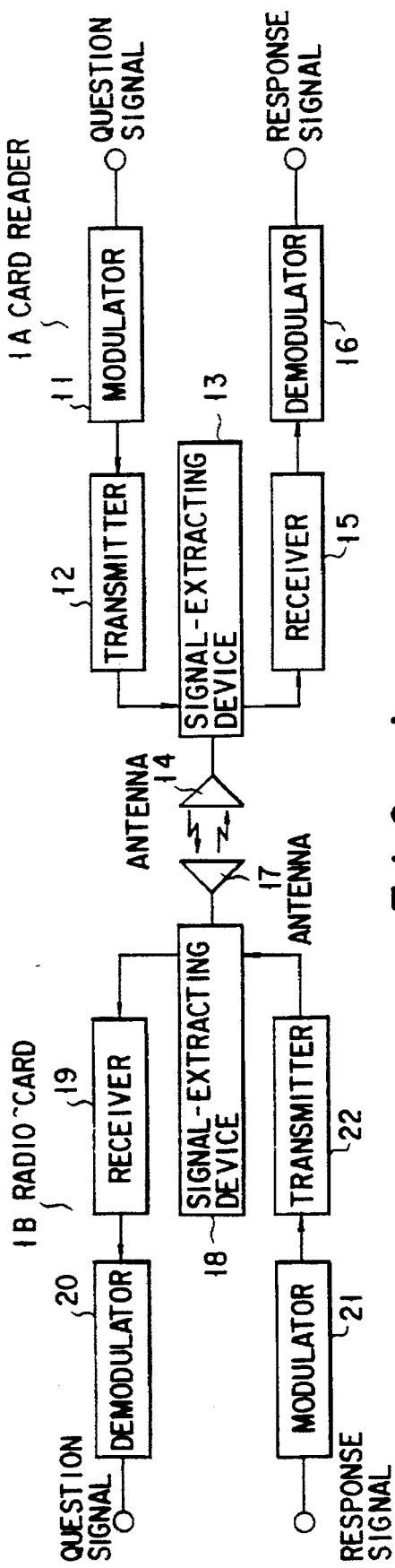
FIG. 1 is a block diagram showing a conventional radio-card communication system.
Figure 2:
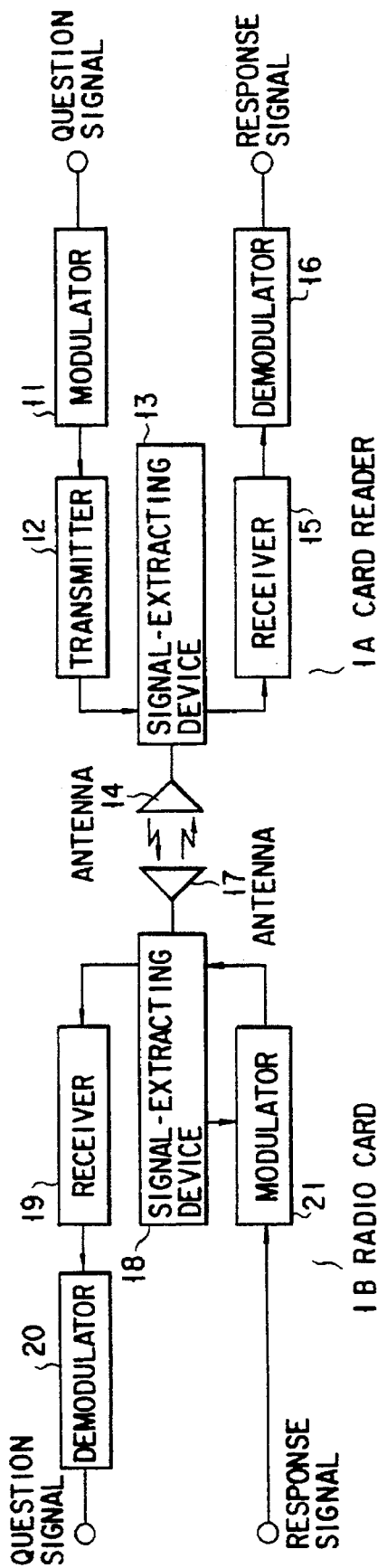
FIG. 2 is a block diagram depicting another type of a conventional radio-card communication system.
Figure 3A:
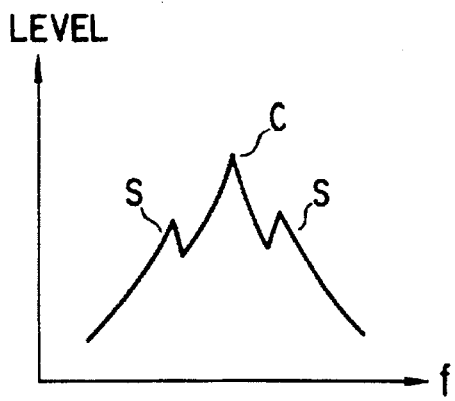
FIGS. 3A and 3B are frequency-spectrum diagrams for explaining the problem inherent in the conventional system of FIG. 2.
Figure 3B:
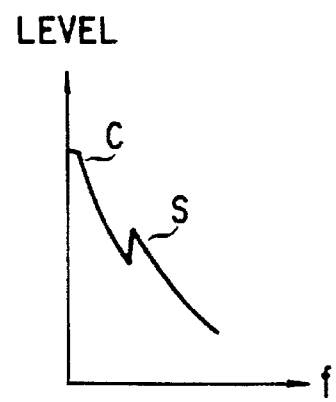
Figure 5:
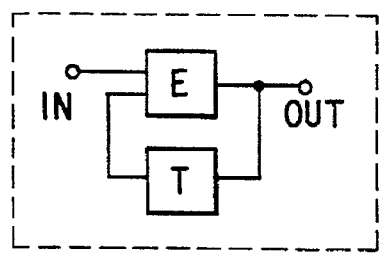
FIG. 5 is a block diagram of the circuit provided in the system of FIG. 4, for effecting differential coding on input data.

The differential coding is effected by the circuit shown in FIG. 5. As illustrated in FIG. 5, the circuit comprises an input terminal IN, an exclusive OR circuit E, a delay circuit T, and an output terminal OUT. The delay circuit T has a delay time which is equal to the unit time of the codes constituting the response data. The delay circuit T delays the output of the exclusive OR circuit E, and the exclusive OR circuit produces an exclusive logic sum of the data delayed by the circuit T and the data not delayed.

Meanwhile, the sub-carrier generated by a sub-carrier generator 52 is supplied to the second PSK modulator 51. The PSK modulator 51 phase-modulates the sub-carrier with the response data, generating a PSK signal. The PSK signal is sent to the first PSK modulator 50. The first PSK modulator 50 phase-modulates the carrier sent from the card reader 4A, with the PSK signal, converting the PSK signal to a PSK-PSK signal. The PSK-PSK signal is supplied to the antenna 47 via the signal-extracting device 48 and sent from the antenna 47 toward the card reader 4A.

In the card reader 4A, the antenna 46 catches the PSK-PSK signal sent from the radio card 4B. The signal-extracting device 45 extracts the PSK-PSK signal, which is supplied to a distributor 53. The distributor 53 distributes the signal to two synchronous detectors 54a and 54b.

Two reference signals (carriers) having a phase difference of 90° are supplied to the synchronous detectors 54a and 54b. The signal supplied to the in-phase detector 54a may be regarded as a synchronous reference signal cos ωt. Then the signal supplied to the synchronous detector 54b is regarded as an orthogonal reference signal sin ωt. The detectors 54a and 54b therefore detects phase-modulated components from two reference signals, respectively, which have a phase difference of 90°. Hereinafter, the detectors 54a shall be referred to as "synchronous detector," and the detector 54b as "orthogonal detector." The signal detected by the synchronous detector 54a is supplied to a low-pass filter 55a, and the signal detected by the orthogonal filter 54b to a low-pass filters 55b, respectively. The filters 55a and 55b extract sub-carrier components from the respective input signals. The sub-carrier components are input to delay detectors 56a and 56b.

Figure 6:
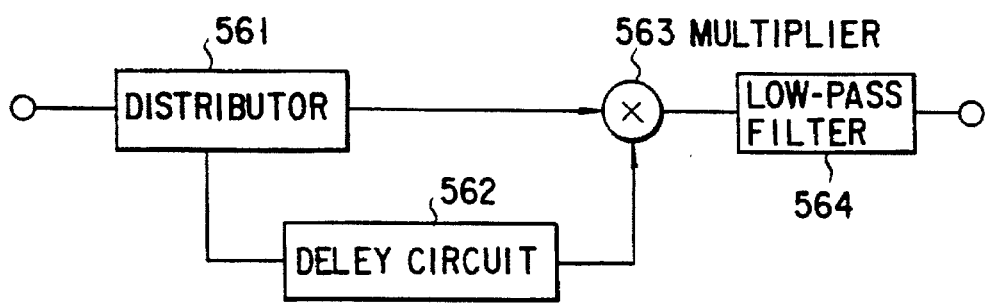
FIG. 6 is a block diagram of either delay detector incorporated in the system of FIG. 4.

The delay detectors 56a and 56b have the same structure, which will be described with reference to FIG. 6. Either delay detector comprises a distributor 561, a delay circuit 562, a multiplier 563 and a low-pass filter 564. The distributor 561 receives the data sent from the radio card 4b and distributes it to the delay circuit 562 and the multiplier 563. The delay circuit 562 delays by a preset time each bit (either "1" or "0") of the data sent from the radio card 4B. The data thus delayed is supplied to the multiplier 563. The multiplier 563 multiplies the signal supplied from the distributor 561 and not delayed at all, with the signal supplied from the delay circuit 562 and delayed by the preset time. As a result, the multiplier 563 outputs a signal which is proportional to the cosine function (cos θ) of the phase difference θ between the sub-carrier not delayed and the corresponding sub-carrier delayed by the preset time. The output of the multiplier 563 is supplied to the low-pass filter 564. The low-pass filter 564 extracts a component which is contained in the output of the multiplier 563 and which has a frequency twice that of the sub-carrier. Therefore, each of the delay detectors 56a and 56b outputs +1 when the two input signals have a difference of 0 and outputs −1 when the two input signals have a phase difference of 180°.

As can be understood from FIG. 4, the outputs of the delay detectors 56a and 56b (FIG. 4) are supplied to an adder 57 and added together. The sum of the outputs is supplied to a data discriminator 58. The data discriminator 58 determines the level of the signal output by the adder 57. More precisely, the discriminator 58 outputs "0" when the outputs of both delay detectors 56a and 56b are +1 and outputs "1" when the outputs of both delay detectors 56a and 56b are −1. The output of the data discriminator 58 is supplied to a terminal T4.

The timing of data communication achieved between the card reader 4A and radio card 4B of the system of FIG. 4 will now be explained with reference to FIGS. 7A and 7B. FIG. 7A is a timing chart depicting the operation of the card reader 4A, and FIG. 7B a timing chart illustrating the operation of the radio card 4B. As seen from FIG. 7A, the card reader 4A sends an ASK-modulated signal M to the radio card 4B during a period $t_1$, and receives data from the radio card 4B and sends a carrier CA to the radio card 4B during the next period $t_2$. As can be understood from FIG. 7B, the radio card 4B receives data from the card reader 4A during the period $t_1$ and converts the carrier CA sent from the card reader 4A to a PSK signal.

Signals exchanged between the card reader 4A and the radio card 4B will be described.

The output R(t) which the second PSK modulator 51 (FIG. 4) of the radio card 4B is expressed as follows:

$$R(t)=\cos\{pt+\theta(t)\} \qquad (1)$$

where p is the angular frequency of the sub-carrier used and θ(t) is the phase-modulated component of the sub-carrier. θ(t) takes the value of π when the data obtained by performing differential coding on the data from the radio card 4A is "1", and takes the value of 0 when said data is "0".

The output S(t) of the first PSK modulator 50 (FIG. 4), which has been produced by phase-modulating the carrier with the PSK signal of Equation (1), is given as:

$$S(t)=\cos(\omega t+\psi)\cos\{pt+\theta(t)\} \qquad (2)$$

where ω is the angular frequency of the carrier not modulated, and ψ is the phase difference between the carrier for the signal and each of the reference signals input respectively to the synchronous detector 54a and the orthogonal detector 54b. It should be noted that the phase difference ψ changes with time when the radio card 4B is moved.

The PSK-PSK signal, the output signal of the first PSK modulator 50, is sent from the radio card 4B to the card reader 4A. In the card reader 4A, the distributor 53 distributes the PSK-PSK signal represented by Equation (2), to the synchronous detector 54a and to the orthogonal detector 54b. In the synchronous detector 54a, the PSK-PSK signal is multiplied by the reference signal cos ωt. In the orthogonal detector 54b, the PSK-PSK signal is multiplied by the reference signal sin ωt. As indicated above, the reference signals have a phase difference of 90°. The output of the synchronous detector 54a is input to the low-pass filter 55a, and the output of the orthogonal detector 54b to the low-pass filter 55b.

The low-pass filter 55a extracts a sub-carrier component DI(t), and the low-pass filter 55b a sub-carrier component DQ(t). The sub-carrier components DI(t) and DQ(t) are represented as follows:

$$\begin{aligned} DI(t) &= [\cos\omega t \cdot \cos(\omega t+\psi) \cdot \cos\{pt+\theta(t)\}] \qquad (3)\\ &= 1/2 \cdot \cos\psi \cdot \cos\{pt+\theta(t)\} \end{aligned}$$

$$\begin{aligned} DQ(t) &= [\sin\omega t \cdot \cos(\omega t+\psi) \cdot \cos\{pt+\theta(t)\}] \qquad (4)\\ &= 1/2 \cdot \sin\psi \cdot \cos\{pt+\theta(t)\} \end{aligned}$$

The brackets [] in Equations (3) and (4) mean that an average of the terms written in these brackets is taken. Namely, the sub-carrier components DI(t) and DQ(t) are low-band components of the detectors 54a and 54b.

In each of the delay detectors 56a and 56b, the delay circuit 562 (FIG. 6) delays the input signal D(t) by a preset time, and the multiplier 563 multiplies the delayed input signal by the input signal supplied from the distributor 561 and not delayed at all. The output of the delay circuit 562, i.e., the signal D(t) delayed by the present time, is given by the following Equation (5):

$$\tfrac{1}{2}\cos\{p(t-T)+\theta(t-T)\}\cdot\cos\psi \qquad (5)$$

Here it is assumed that the phase of the carrier changes during said preset time, but by a negligibly small amount.

Multiplying the value of Equation (3) by that of Equation (5) yields the following:

$$EI(t)=[\tfrac{1}{2}\cos\{pt+\theta(t)\}\cdot\cos\psi]\times[\tfrac{1}{2}\cos\{p(t-T)+\theta(t-T)\}\cdot\cos\psi] \qquad (6)$$

The delay circuit 562 (FIG. 6) is designed so as to make the sub-carrier delayed by the present time preserve the same phase as it had before being delayed. Hence, the term p(t−T) in Equation (6) reduces to:

$$p(t-T)=pt \qquad (7)$$

Substituting Equation (7) in Equation (6), we obtain:

$$EI(t)=\tfrac{1}{4}\cos^2\psi[\cos\{pt+\theta(t-T)\}]\times[\cos\{pt+\theta(t)\}] \qquad (8)$$

where θ(t) and θ(t−T) are the phases the sub-carrier assumes at time t and the preset time before time t, respectively, and take a value of either 0 or π. Therefore, EI(t) in Equation (8) can have the following two alternative values:

$$EI(t) = 1/4 \cdot \cos^2\psi \cdot \cos^2 pt \theta(t) - \theta(t-T) = 0, \text{ or} \quad (9)$$

$$EI(t) = -1/4 \cdot \cos^2\psi \cdot \cos^2 pt \theta(t) - \theta(t-T)$$

$$= \pm\pi$$

respectively, and take a value of either 0 or $\pi$. Therefore, EI(t) in Equation (8) can have the following two alternative values:

Let the exclusive logic sum of the consecutive codes correspond to phase differences. Then, EI(t) will be defined as follows:

$$EI(t) = A(nT) \cdot \cos^2\psi \cdot \cos^2 pt \quad (10)$$

where $A(nT)$ is a function which assumes the value of 1 when the phase difference is 0, and the value of $-1$ when the phase difference is $\pm\pi$.

The output of the multiplier 563, i.e., EI(t), is passed through the low-pass filter 564 (FIG. 6), which outputs a signal expressed as follows:

$$EI(t) = [A(nT) \cdot 1/4 \cdot \cos^2\psi \cdot \cos^2 pt] \quad (11)$$

$$= 1/8 \cdot A(nT) \cdot \cos^2\psi$$

The right side of the Equation (11), i.e., the terms in brackets "[ ]," correspond to the acquisition of a mean value and indicates the extraction of the low-frequency component of the output EI(t) of the multiplier 563.

Similarly, the output FQ(t) of the low-pass filter 55b connected to the output of the orthogonal detector 54b is expressed as:

$$FQ(t) = A(nT) \cdot 1/4 \cdot \sin^2\psi \cdot \cos^2 pt \quad (12)$$

$$= 1/8 \cdot A(nT) \cdot \sin^2\psi$$

The output EI(t) of the delay detector 56a, defined by Equation (11), and the output FQ(t) of the delay detector 56b, defined by Equation (12), are added by the adder 57. The adder 57 generates an output G(t), which is given as follows:

$$G(t) = 1/8 \cdot A(nT)\{\sin^2\psi + \cos^2\psi\} \quad (13)$$

$$= 1/8 \cdot A(nT)$$

As may be understood from Equation (13), the output G(t) of the adder 57 is a reproduced series of the data codes sent from the radio card 4B. The output G(t) is input to the data discriminator 58 (FIG. 4). The discriminator 58 determines the level of the input signal, i.e., G(t). The levels of signals, the data discriminator 58 has determined, are converted to a series of bits, some of which are "0" and the other of which are "1." Thus, the response signal sent from the radio card 4B can be demodulated correctly.

The radio-card communications system shown in FIG. 4 is designed such that the card reader 4A processes analog signals to demodulate the response signal transmitted from the radio card 4B. According to the present invention, digital signals may instead by processed in the card reader 4A. FIG. 8 shows a part of a radio-card communications system according to the second embodiment of the invention, in which the carrier is subjected to digital demodulation in the card reader.

The radio card of the second embodiment, which is not shown in FIG. 8, is identical to the radio card 4B illustrated in FIG. 4. As shown in FIG. 8, the card reader of the second embodiment has detectors 54a and 54b and low-pass filters 55a and 55b, which perform exactly the same functions as their counterparts of the card reader 4A illustrated in FIG. 4.

The card reader shown in FIG. 8 is characterized by the components which are provided on the output side of the low-pass filters 55a and 55b, as will be described below.

The outputs of the low-pass filters 55a and 55b are supplied to A/D converters 61a and 61b, respectively. The A/D converters 61a and 61b have a sampling frequency which is twice or more the frequency of the sub-carrier used, and convert the input signals to PCM signals. The PCM signals are supplied to digital delay detectors 62a and 62b and are delayed and detected.

The digital delay detector 62a has a delay memory M1, a multiplier N1 and a digital filter F1. Similarly, the digital delay detector 62b has a delay memory M2, a multiplier N2 and a digital filter F2.

In the delay detector 62a, the PCM signal input from the A/D converter 61a is supplied to the multiplier N1 and also to the delay memory M1. The delay memory M1 delays the PCM signal by a preset time. The PCM signal thus delayed is supplied to the multiplier N1. The multiplier N1 multiplies the delayed PCM signal by the PCM signal supplied from the A/D converter 61a. The product of the PCM signals, obtained by the multiplier N1, is input to the digital filter F1. The filter F1 extracts a data component from the product of the PCM signals. In the digital delay detector 62a, the PCM signal input from the A/D converter 62a is processed in the same way as in the digital delay detector 62b. The digital delay detectors 62a and 62b perform the same function as the analog delay detectors 56a and 56b incorporated in the first embodiment (FIG. 4).

The outputs of the digital delay detectors 62a and 62b are input to a digital adder 63. The digital adder 63 adds the input signals, generating a PCM signal. The MSB (Most Significant Bit) of the PCM signal represents polarity. The data sent from radio card (not shown) can therefore be detected from the value of the MSB of the PCM signal. Thus, the second embodiment requires no component equivalent to the data discriminator 58 (FIG. 4).

The delay memories M1 and M2 can be RAMs (Random-Access Memories) which are inexpensive. It follows that the digital delay detectors 62a and 62b can be manufactured at low cost. Furthermore, the digital delay detectors 62a and 62b can easily be adjusted while being manufactured and have stable operating characteristics.

A radio card according to the third embodiment of the invention will be described, with reference to FIG. 9. Like the first and second embodiment, the third embodiment comprises a card reader and a radio card. The radio card, not shown in FIG. 9, is identical to the radio card 4B illustrated in FIG. 4. As shown in FIG. 9, the card reader has detectors 54a and 54b and low-pass filters 55a and 55b, which perform exactly the same functions as their counterparts of the card reader 4A illustrated in FIG. 4. The card reader is characterized by the components which are provided on the output side of the low-pass filters 55a and 55b, as will be described below.

The outputs of the low-pass filters 55a and 55b are connected to an analog multiplexer 71. The analog multiplexer 71 has its output connected to an A/D converter 72. It selects the low-pass filters 55a and 55b alternately, at a speed corresponding to a frequency twice as high as the sampling frequency of the A/D converter 72. The A/D converter 72 samples the output signal of the analog multiplexer 71 at a predetermined frequency, converting the input signal to a PCM signal. The PCM signal is input to a digital delay detector 73.

The digital delay detector 73 is identical in structure to the delay detectors 62a and 62b used in the second embodiment (FIG. 8). More correctly, as shown in FIG. 9, it comprises a delay memory M3, a multiplier N3 and a digital filter F3. The output of the delay detector 73 is a response signal (data), which will be sent from the card reader to the radio card (not shown).

The analog multiplexer 71 and the digital delay detector 73 are operated at the frequency twice as high as the sampling frequency of the A/D converter thereby performing time-division processing on signal. The A/D converter 72 and the digital delay detector 73 can therefore be provided in the form of a single system. In the output of the delay detector 73, in-phase components I and orthogonal components Q appear alternately. Hence, if the output of the delay detector 73 is passed through a digital low-pass filter, the outputs of the systems I and Q can be added at the same time the codes constituting the output of the detector 73 are recognized.

To process signals digitally, an operation unit designed exclusively to perform digital processing may be used. The operation unit may be, for example, a DSP (Digital Signal Processor).

In the embodiments described above, the carrier sent from the card reader is modulated in the radio card. Alternatively, the carrier may have its frequency either multiplied or divided in the radio card before it is modulated.

Figure 10:
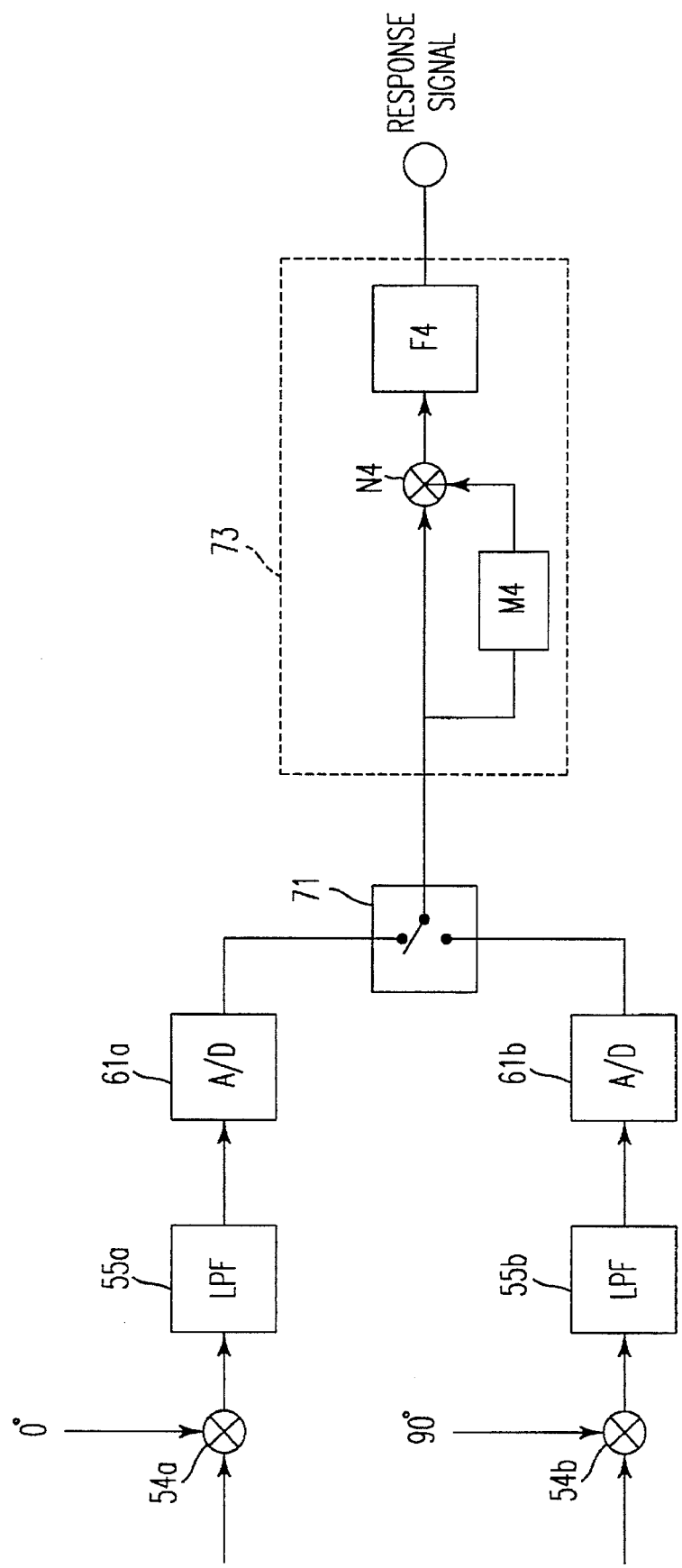
FIG. 10 is a block diagram showing a radio-card communications system according to a fourth embodiment of this invention.

In the third embodiment (FIG. 9), the outputs of the low-pass filters 65a and 65b are alternately selected by the analog multiplexer 71 before they are converted to PCM signals by the A/D converter 72. Instead, the outputs of the filters 65a and 65b can first be converted into PCM signals by two A/D converters 61a and 61b, and the PCM signals may be alternately selected by the analog multiplexer 71 to be provided to digital delay detector 73 with a delay memory M4, a multiplier N4, and a digital filter F4 as indicated in FIG. 10.

As has been described above, in the radio-card communications system according to the present invention, the signals input to the card reader from the radio card are not adversely influenced in a card reader even if carriers of the same frequencies are used to transmit signals from the card reader to a radio card and vice versa, and the power consumption in the radio card can therefore be minimized to reduce the size of the battery incorporated in the radio card.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radio-card communications system having a radio card for transmitting a response signal in response to a question signal, and a card reader for transmitting the question signal and receiving the response signal, said radio card comprising:

carrier-receiving means for receiving a carrier transmitted from said card reader;

sub-carrier generating means for generating a sub-carrier having a frequency lower than a frequency of the carrier;

first phase-modulating means for phase-modulating the sub-carrier with the response signal, thereby to generate a PSK signal;

second phase-modulating means for phase-modulating the carrier with the PSK signal, thereby to generate a PSK-PSK signal; and PSK-PSK signal transmitting means for transmitting the PSK-PSK signal to said card reader; and said card reader comprising:

carrier-transmitting means for transmitting the carrier to said radio card in response to the response signal;

PSK-PSK signal receiving means for receiving the PSK-PSK signal from said radio card;

sub-carrier extracting means for performing orthogonal detection on the PSK-PSK signal, thereby to extract a sub-carrier component; and demodulating means for extracting a phase-modulated component from the sub-carrier component, thereby to demodulate the response signal.

2. The system according to claim 1, wherein said radio card further comprises: an exclusive logic-sum circuit for obtaining an exclusive logic sum of data about said response signal and other data and a delay circuit for delaying an output of said exclusive logic-sum circuit by a preset time, and wherein an output of said delay circuit is input to said exclusive logic-sum circuit, a logic sum obtained by said logic-sum circuit is supplied to said first phase-modulating means.

3. The system according to claim 2, wherein said sub-carrier extracting means comprises first and second synchronous detectors for detecting the PSK-PSK signal by using, respectively, an in-phase reference signal and an orthogonal reference signal 90° out of phase with respect to the in-phase reference signal, and first and second filters for extracting sub-carrier components from signals detected by said first and second synchronous detectors; and said demodulating means comprises first and second delay detectors for detecting outputs of said first and second filters, respectively, thereby to extract the phase-modulated components, an adder for adding outputs of said delay detectors, and a data discriminator for discriminating the data about the response signal in accordance with an output level of said adder.

4. The system according to claim 3, wherein each of said delay detectors comprises a distributor for distributing the sub-carrier component in the form of first and second outputs, a delay circuit for delaying the first output by the preset time, a multiplier for multiplying an output of said delay circuit by the second output of said distributor, and a filter circuit for extracting a phase-modulated component from an output of said multiplier.

5. The system according to claim 2, wherein said sub-carrier extracting means comprises first and second synchronous detectors for detecting the PSK-PSK signal by using, respectively, an in-phase reference signal and an orthogonal reference signal 90° out of phase with respect to the in-phase reference signal, and first and second filters for extracting sub-carrier components from signals detected by said first and second synchronous detectors; and said demodulating means comprises first and second A/D converters for converting, respectively, outputs of said first and second filters to digital signals, first and second digital delay detectors for detecting and delaying, respectively, outputs of said first and second A/D converters, thereby to extract the phase-modulated components, a digital adder for adding outputs of said digital delay detectors, and said demodulating means outputs, as said response signal, a data bit contained in an output of said digital adder and representing a polarity of the output of said digital adder.

6. The system according to claim 5, wherein each said digital delay detector comprises a delay memory for delaying an input digital signal by the preset time, a multiplier receiving and multiplying an output of said delay memory and said input digital signal, and a digital filter for extracting a phase-modulated component from an output of said multiplier.

7. The system according to claim 2, wherein said sub-carrier extracting means comprises first and second synchronous detectors for detecting the PSK-PSK signal by using, respectively, an in-phase reference signal and an orthogonal reference signal 90° out of phase with respect to the in-phase reference signal, and first and second filters for extracting sub-carrier components from signals detected by said first and second synchronous detectors; and said demodulating means comprises first and second A/D converters for converting, respectively, outputs of said first and second filters to digital signals, a multiplexer for alternately selecting outputs of the first and second A/D converters, and a digital delay detector for detecting and delaying an output of said multiplexer, thereby to extract a phase-shifted component, and said demodulating means outputs, as said response signal, a data bit contained in an output of said digital delay detector and representing a polarity of the output of said digital delay detector.

8. The system according to claim 2, wherein said sub-carrier extracting means comprises first and second synchronous detectors for detecting the PSK-PSK signal by using, respectively, an in-phase reference signal and an orthogonal reference signal 90° out of phase with respect to the in-phase reference signal, and first and second filters for extracting sub-carrier components from signals detected by said first and second synchronous detectors; and said demodulating means comprises a multiplexer for alternately selecting outputs of the first and second filters, an A/D converter for converting, respectively, an output of said multiplexer, and a digital delay detector for detecting and delaying an output of said D/A converter, thereby to extract a phase-shifted component, and said demodulating means outputs, as said response signal, a data bit contained in an output of said digital delay detector and representing a polarity of the output of said digital delay detector.

9. The system according to any one of claims 7-8 wherein said digital delay detector comprises a delay memory for delaying an input digital signal by the preset time, a multiplier receiving and multiplying an output of said delay memory and said input digital signal, and a digital filter for extracting a phase-modulated component from an output of said multiplier.

* * * * *